United States Patent
Agarwal et al.

(10) Patent No.: US 9,800,640 B2
(45) Date of Patent: Oct. 24, 2017

(54) DIFFERENTIAL ENCODER WITH LOOK-AHEAD SYNCHRONIZATION

(71) Applicant: International Business Machines Corporation, Armonk, NY (US)

(72) Inventors: Kanak B. Agarwal, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 14/044,212

(22) Filed: Oct. 2, 2013

(65) Prior Publication Data

US 2015/0095452 A1 Apr. 2, 2015

(51) Int. Cl.
G06F 15/16 (2006.01)
H04L 29/06 (2006.01)

(52) U.S. Cl.
CPC .......... H04L 65/607 (2013.01); H04L 65/602 (2013.01)

(58) Field of Classification Search
CPC ..... H04L 65/607; H04L 65/602; H04L 29/06; H04L 29/08
USPC ........................................................ 709/219
See application file for complete search history.

(56) References Cited

U.S. PATENT DOCUMENTS

| 5,051,745 A | 9/1991 | Katz |
| 5,155,484 A | 10/1992 | Chambers |
| 5,434,872 A * | 7/1995 | Petersen ............... G06F 13/128 370/445 |
| 5,440,753 A | 8/1995 | Hou et al. |
| 5,461,679 A | 10/1995 | Normile et al. |
| 5,487,172 A * | 1/1996 | Hyatt .................. B60R 16/0373 700/8 |
| 5,506,580 A | 4/1996 | Whiting et al. |
| 5,754,534 A * | 5/1998 | Nahumi ............... H04M 3/568 370/261 |
| 5,890,006 A | 3/1999 | Tran et al. |

(Continued)

FOREIGN PATENT DOCUMENTS

| CN | 102270224 | 12/2011 |
| EP | 0877320 | 4/1998 |

(Continued)

OTHER PUBLICATIONS

Office Action for U.S. Appl. No. 13/313,072, U.S. Patent and Trademark Office, mailed May 13, 2013, 16 pages.

(Continued)

*Primary Examiner* — Anthony Mejia
(74) *Attorney, Agent, or Firm* — VanLeeuwen & VanLeeuwen; Mercedes L. Hobson (57) ABSTRACT

An approach is provided in which in which a data stream encoder resynchronizes a reference template to a data stream by loading a lock step buffer and a look-ahead buffer with template data blocks retrieved from the reference template. The data stream encoder determines that the lock step buffer's template data is different from a data stream data block and, in turn, preserves the template data block in the look-ahead buffer for subsequent resynchronization. In turn, the data stream encoder matches the look-ahead buffer's preserved template data with a subsequent data stream data block and resynchronizes the reference template to the data stream accordingly.

14 Claims, 9 Drawing Sheets

(56) References Cited

U.S. PATENT DOCUMENTS

| | | | |
|---|---|---|---|
| 5,933,104 A * | 8/1999 | Kimura | H03M 7/3086 341/51 |
| 5,963,154 A | 10/1999 | Wise et al. | |
| 6,061,775 A | 5/2000 | Tran et al. | |
| 6,215,424 B1 | 4/2001 | Cooper | |
| 6,219,457 B1 | 4/2001 | Potu | |
| 6,310,563 B1 | 10/2001 | Har et al. | |
| 6,374,314 B1 * | 4/2002 | Darnell | H04L 29/06 710/29 |
| 6,489,902 B2 | 12/2002 | Heath | |
| 6,657,565 B2 | 12/2003 | Kampf | |
| 6,693,567 B2 | 2/2004 | Cockburn et al. | |
| 6,732,198 B1 | 5/2004 | Johnson et al. | |
| 6,781,529 B1 | 8/2004 | Lin et al. | |
| 6,822,589 B1 | 11/2004 | Dye et al. | |
| 6,865,668 B1 | 3/2005 | Benes et al. | |
| 6,944,751 B2 | 9/2005 | Fetzer et al. | |
| 7,046,663 B1 * | 5/2006 | Temoshenko | H04L 12/2854 370/390 |
| 7,180,433 B1 | 2/2007 | Grotmol | |
| 7,233,265 B2 | 6/2007 | Cockburn et al. | |
| 7,305,542 B2 | 12/2007 | Madduri | |
| 7,439,883 B1 | 10/2008 | Moni et al. | |
| 7,444,596 B1 * | 10/2008 | Cope | G06F 9/546 715/235 |
| 7,453,377 B2 | 11/2008 | Lee et al. | |
| 7,492,290 B1 | 2/2009 | Schneider | |
| 7,500,103 B2 | 3/2009 | Cockburn et al. | |
| 7,640,417 B2 | 12/2009 | Madduri | |
| 7,681,013 B1 | 3/2010 | Trivedi et al. | |
| 7,685,226 B1 * | 3/2010 | Norton | H04L 41/046 370/338 |
| 7,817,069 B2 | 10/2010 | Schneider | |
| 7,872,598 B2 | 1/2011 | Baktir et al. | |
| 7,957,409 B2 * | 6/2011 | Golshan | H04L 12/4633 370/386 |
| 8,013,762 B2 | 9/2011 | Matthews et al. | |
| 8,125,357 B1 | 2/2012 | Hamlet et al. | |
| 8,244,911 B2 | 8/2012 | Bass et al. | |
| 8,325,069 B2 | 12/2012 | Gopal et al. | |
| 9,535,844 B1 * | 1/2017 | Cooney | G06F 12/0866 |
| 2003/0091242 A1 | 5/2003 | Kakarala et al. | |
| 2003/0152078 A1 * | 8/2003 | Henderson | H04L 29/06 370/389 |
| 2003/0163672 A1 | 8/2003 | Fetzer et al. | |
| 2003/0185305 A1 | 10/2003 | Macinnis et al. | |
| 2003/0236964 A1 | 12/2003 | Madduri | |
| 2004/0028141 A1 | 2/2004 | Hsiun et al. | |
| 2004/0116143 A1 | 6/2004 | Love et al. | |
| 2004/0120404 A1 | 6/2004 | Sugahara et al. | |
| 2004/0221143 A1 | 11/2004 | Wise et al. | |
| 2004/0264696 A1 | 12/2004 | Cockburn et al. | |
| 2005/0050106 A1 * | 3/2005 | Wenner | G06F 17/3048 |
| 2005/0128109 A1 | 6/2005 | Sane et al. | |
| 2005/0169364 A1 | 8/2005 | Singh | |
| 2005/0206646 A1 * | 9/2005 | Alcorn | G06F 3/14 345/506 |
| 2006/0067362 A1 * | 3/2006 | Ramakrishnan | H04N 21/235 370/468 |
| 2006/0174287 A1 | 8/2006 | Meada | |
| 2006/0291560 A1 | 12/2006 | Penna et al. | |
| 2007/0031122 A1 * | 2/2007 | Yamagata | G11B 20/00086 386/248 |
| 2007/0113222 A1 | 5/2007 | Diqnum et al. | |
| 2007/0174588 A1 | 7/2007 | Fuin | |
| 2008/0022074 A1 | 1/2008 | Madduri | |
| 2008/0198047 A1 | 8/2008 | Niemi et al. | |
| 2008/0232461 A1 | 9/2008 | Dachiku | |
| 2009/0006510 A1 | 1/2009 | Laker et al. | |
| 2009/0089507 A1 | 4/2009 | Chen | |
| 2009/0220009 A1 | 9/2009 | Tomita et al. | |
| 2010/0020825 A1 | 1/2010 | Bass et al. | |
| 2010/0064196 A1 * | 3/2010 | Tseng | G06F 11/1004 714/752 |
| 2010/0075611 A1 * | 3/2010 | Budampati | H04B 7/0885 455/67.11 |
| 2010/0141488 A1 | 6/2010 | Baktir et al. | |
| 2010/0146138 A1 * | 6/2010 | Ng | H04L 65/80 709/231 |
| 2010/0150223 A1 * | 6/2010 | Nagaraj | H04N 19/70 375/240.01 |
| 2010/0158407 A1 * | 6/2010 | Standfield | G06T 5/009 382/270 |
| 2010/0225506 A1 * | 9/2010 | Chen | H03M 7/3086 341/51 |
| 2011/0060927 A1 | 3/2011 | Fillingim et al. | |
| 2011/0069757 A1 * | 3/2011 | Ammu | H04N 19/006 375/240.12 |
| 2011/0141364 A1 * | 6/2011 | Lee | H04N 5/4401 348/569 |
| 2011/0208833 A1 | 8/2011 | Fallon | |
| 2011/0276157 A1 * | 11/2011 | Wang | G06F 17/30861 700/94 |
| 2011/0280314 A1 | 11/2011 | Sankaran et al. | |
| 2013/0103695 A1 | 4/2013 | Rarrick et al. | |
| 2013/0147644 A1 | 6/2013 | Agarwal | |
| 2013/0148745 A1 | 6/2013 | Agarwal | |
| 2014/0093085 A1 | 4/2014 | Jarvis et al. | |

FOREIGN PATENT DOCUMENTS

| | | |
|---|---|---|
| EP | 0891089 | 1/1999 |
| WO | 2009134932 | 11/2009 |

OTHER PUBLICATIONS

Office Action for U.S. Appl. No. 13/313,072, U.S. Patent and Trademark Office, mailed Dec. 31, 2013, 16 pages.

Office Action for U.S. Appl. No. 13/555,547, U.S. Patent and Trademark Office, mailed Jun. 4, 2013, 14 pages.

Notice of Allowance for U.S. Appl. No. 13/555,547, U.S. Patent and Trademark Office, mailed Jan. 2, 2014, 14 pages.

Deutsch, "Deflate Compressed Data Format Specification version 1.3," Network Working Group RFC 1951, May 1996, 25 pages.

Lee et al., "Token-Ring Reservation Enhancer for Early Token Release," IBM Technical Disclosure Bulletin, vol. 33, No. 7, IPCOMM000102647D, Dec. 1, 1990, 6 pages.

Moertl et al., "Direct Access Storage Device Compression and Decompression Data Flow," IBM Technical Disclosure Bulletin, vol. 38, No. 11, IPCOM000116855D, Nov. 1, 1995, 5 pages.

Surtees et al., "Signaling Compression (SigComp) User's Guide," Internet Society, ip.com, IPCOM000136745D, May 1, 2006, 45 pages.

ASPRS Board, "LAS Specification Version 1.2," ASPRS Board Meeting, Sep. 2, 2008, 13 pages.

Pereira, "IP Payload Compression Using DEFLATE," Internet Society, ip.com, IPCOM000002967D, Dec. 1, 1998, 6 pages.

Deutsch et al., "ZLIB Compressed Data Format Specification Version 3.3," Internet Society, ip.com, IPCOM000004248D, May 1, 1996, 13 pages.

Office Action for U.S. Appl. No. 14/012,382, U.S. Patent and Trademark Office, mailed Feb. 1, 2016, 33 pages.

Notice of Allowance for U.S. Appl. No. 14/012,452, U.S. Patent and Trademark Office, mailed Aug. 21, 2014, 17 pages.

Blanco et al., "Dynamic Random Access Memory Refresh Method in Triple-Modular-Redundant System," IBM Technical Disclosure Bulletin, Jul. 1, 1993, vol. 36, No. 07, pp. 7-12.

Burger et al., "A Session Initiation Protocol (SIP) Event Package for Key Press Stimulus (KPML)," Internet Society, Standards Track, Request for Comments 4730, Nov. 1, 2006, 58 pages.

Office Action for U.S. Appl. No. 15/130,562, U.S. Patent and Trademark Office, mailed Jul. 28, 2016, 31 pages.

Final Office Action for U.S. Appl. No. 15/130,562, U.S. Patent and Trademark Office, mailed Jan. 23, 2017, 18 pages.

* cited by examiner

| Message Type | Number of Messages | Average Size | Common Content | Ratio % Common/Avg |
|---|---|---|---|---|
| message type A | 1504 | 23762 | 22670 | 95.4% |
| message type B | 1504 | 27805 | 23789 | 85.6% |
| message type C | 1504 | 19651 | 18665 | 95.0% |
| message type D | 1504 | 19611 | 18625 | 95.0% |
| message type E | 501 | 31066 | 26193 | 84.3% |
| message type F | 501 | 27639 | 25936 | 93.8% |
| message type G | 55 | 29742 | 25740 | 86.5% |
| message type H | 55 | 28294 | 24712 | 87.3% |

(columns labeled 210, 220, 230, 240, 250)

DIFFERENTIAL ENCODER WITH LOOK-AHEAD SYNCHRONIZATION

BACKGROUND

The present disclosure relates to a differential encoder with look-ahead synchronization. More particularly, the present disclosure relates to a differential encoder that uses look-ahead buffers to re-synchronize a reference template to data stream messages in response to detecting that the reference template is out of synchronization with the data stream messages.

An enterprise data center may be utilized to service many different types of workloads, including customer workloads, which may originate from clients of an enterprise, as well as organizational workloads, which support the business processes of the enterprise. Frequently, the processing of client and organizational workloads require the communication of a substantial volume of data and messages across the internal and/or external data networks of the data center.

In enterprise data center environments, and more generally, in many data processing environments, network bandwidth is a scarce resource that limits the amount of useful work that can be performed utilizing the resources of the data processing environment. Consequently, a variety of techniques have been developed to reduce the bandwidth and storage requirements to store and/or communicate messages and/or data files. These techniques include data compression, which represents data (e.g., a message or data file) in a more compact form than its original uncompressed form.

Common compression techniques include run length encoding (RLE), arithmetic encoding, Huffman coding, dictionary-based coding, and delta encoding. Delta encoding expresses data as differences between reference data and the data to be encoded. The differences between the reference data and the data to be encoded may then be stored or transmitted in lieu of the data to be encoded.

BRIEF SUMMARY

According to one embodiment of the present disclosure, an approach is provided in which a data stream encoder resynchronizes a reference template to a data stream by loading a lock step buffer and a look-ahead buffer with template data blocks retrieved from the reference template. The data stream encoder determines that the lock step buffer's template data is different from a data stream data block and, in turn, preserves the template data block in the look-ahead buffer for subsequent resynchronization. In turn, the data stream encoder matches the look-ahead buffer's preserved template data with a subsequent data stream data block and resynchronizes the reference template to the data stream accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

Figure 1:
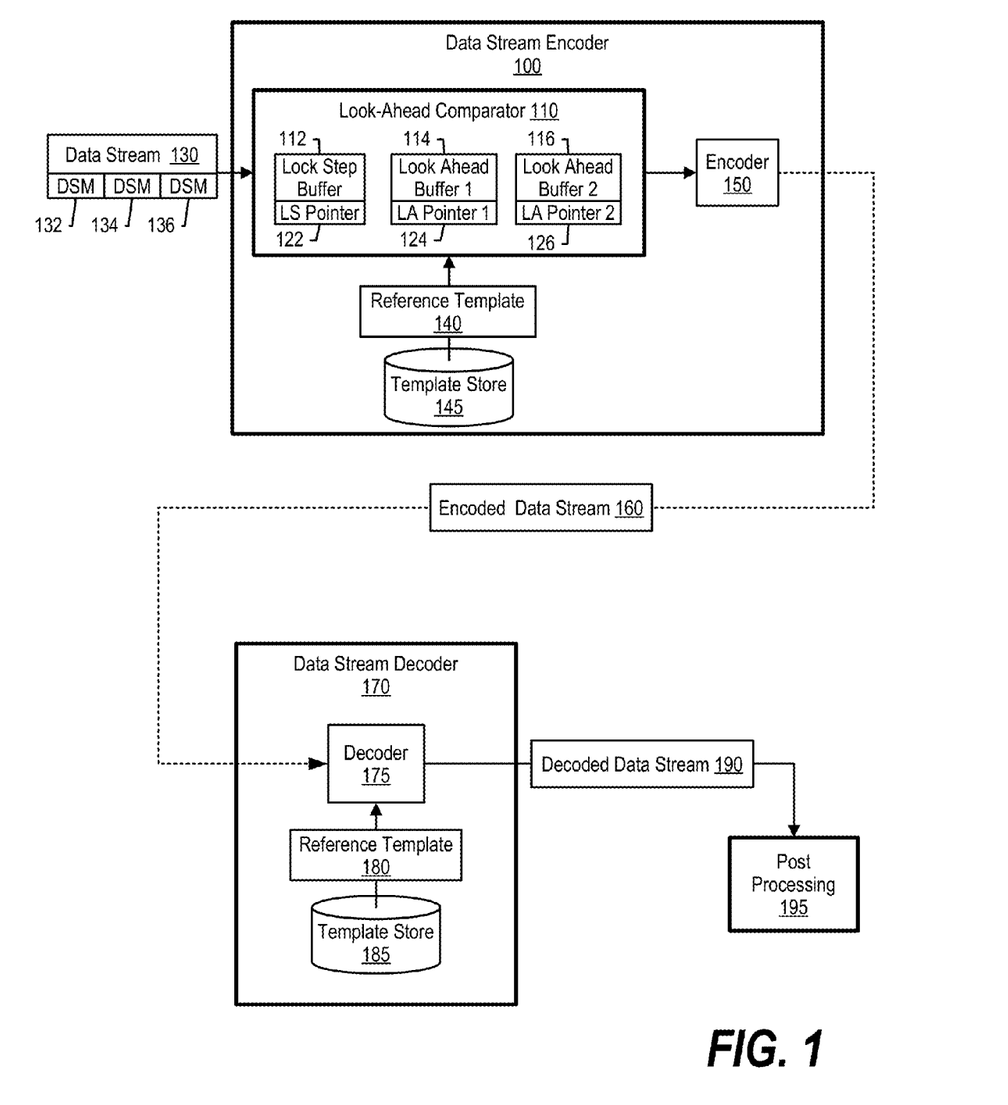
FIG. 1 is a diagram showing one example of a data stream encoder sending encoded differential data based upon comparing data stream messages to reference templates.

FIG. 1 is a diagram showing one example of a data stream encoder sending encoded differential data based upon comparing incoming data stream messages to reference templates. Data stream encoder 100 receives data stream 130, which includes various data stream messages 132, 134, and 136 (e.g., simple object access protocol (SOAP) messages). Data stream encoder 100 includes look-ahead comparator 110 that identifies a message type (e.g., message type A) of each of individual messages 132-136 and retrieves a corresponding reference template from template store 145. In turn, look-ahead comparator 110 synchronizes data blocks (e.g., a set of bytes of template data) in the retrieved reference template to data blocks in the data stream message (e.g., bytes of streaming data). In one embodiment, the reference templates are pre-generated based upon analysis of common content between messages of the same message type (see FIG. 2 and corresponding text for further details).

Data stream encoder 100 encodes data blocks in incoming data stream 130 either as pointer encoding or as literal encoding (the literals in the data stream bytes are encoded directly). Pointer encoding encodes pointer information (e.g., a location in a reference template and number of matching bytes in the reference template) and provides increased data compression because pointer encoding requires less bits to encode the same number of data bytes in the data stream. In addition, pointer encoding requires synchronization between the data stream location and the corresponding location in the reference template.

To efficiently resynchronize a data stream message to the reference template after falling out of synchronization, look-ahead comparator 110 employs a look-ahead synchronization technique utilizing lock step buffer 112, and look-ahead buffers 114 and 116. Lock step buffer 112 stores a template data block from a template data location corresponding to lock step pointer 122 and advances (increments) at the same rate as the incoming data stream. Look-ahead buffers 114 and 116 store template data blocks from template data locations corresponding to look-ahead pointers 124 and 126, respectively. As discussed herein, look-ahead pointers 124 and 126 advance when lock step buffer 112 is synchronized to data stream 130 (matching data), but do not advance when lock step buffer 112 falls out of synchronization with data stream 130. As a result, look-ahead buffers 124 and/or 126 store template data blocks that are eventually matched to data stream data 130 (see FIGS. 3A, 3B, 4A, 4B, and corresponding text for further details).

When a data block comparison between the data stream and lock step buffer 112 results in a hit (match), look-ahead comparator 110 sends the matched pointer information corresponding to lock step pointer 122 to encoder 150 for encoding. As such, data stream encoder 110 sends the encoded pointer information as encoded data stream 160 over a computer network to data stream decoder 170. In one embodiment, the pointer information includes a location in the reference template and a number of matching bytes that match, such as "16 bytes at location 132."

On the receiving side, data stream decoder 170 receives encoded data stream 160 and decodes the encoded pointer information (via decoder 175). As such, data stream decoder 170 extracts template data bytes from reference template 180, which matches reference template 140, based upon the decoded pointer information. In turn, data stream decoder 170 passes the extracted template data to post processing 195 for further processing (decoded data stream 190).

Referring back to look-ahead comparator 110, when lock step buffer 112 falls out of synchronization with data stream 130, look-ahead comparator 110 sends the actual data stream data to encoder 150 for encoding and transmission to data stream decoder 170 via encoded data stream 160. As discussed in more detail below, look-ahead comparator 110 resynchronizes data stream 130 to reference template 140 by matching template data blocks stored in look-ahead buffer 114 and/or 116 with subsequently received data stream data.

Figure 2:
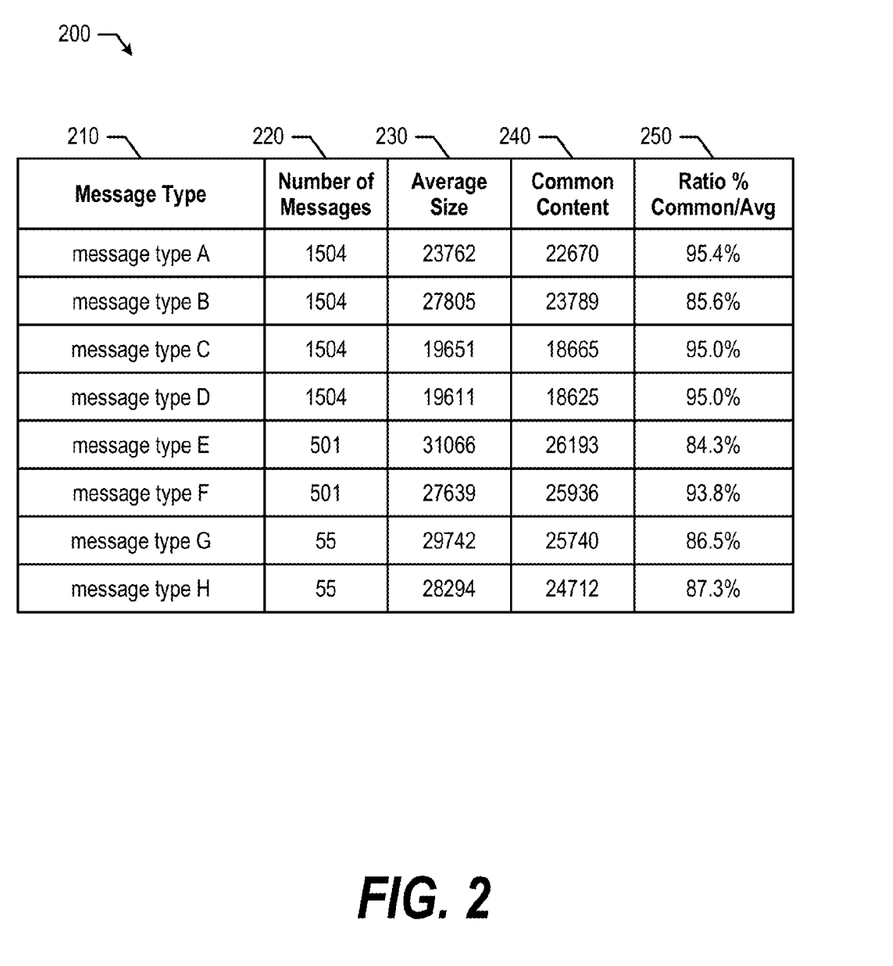
FIG. 2 is a diagram showing an exemplary table that includes message type data gathered for various message types that, in turn, is utilized to determine message type templates and look-ahead buffer offsets for each message type.

FIG. 2 is a diagram showing an exemplary table that includes message type data gathered for various message types that, in turn, is utilized to determine message type templates and look-ahead buffer offsets for each message type. Table 200 includes sample data for eight different message types, such as eight different SOAP (simple object access protocol) messages. Column 210 includes message type identifiers for the eight different message types. Column 220 includes a number of sample messages taken for each message type and column 230 includes the average size of each message type. For example, table 200 shows that 1504 message type A messages were sampled and the average size of the message type A messages was 23762 bytes.

Column 240 includes the amount of common content between messages of the same message type, and column 250 includes a ratio of the common content to the average size of each message type. As can be seen, message type A messages have 22670 bytes of common content, which equates to a ratio percentage of 95.4%. In other words, by creating a reference template for message type A message type based upon the common content, 95.4% of the bytes in the reference template (on average) should match a message type A message in a data stream.

Figure 3A:
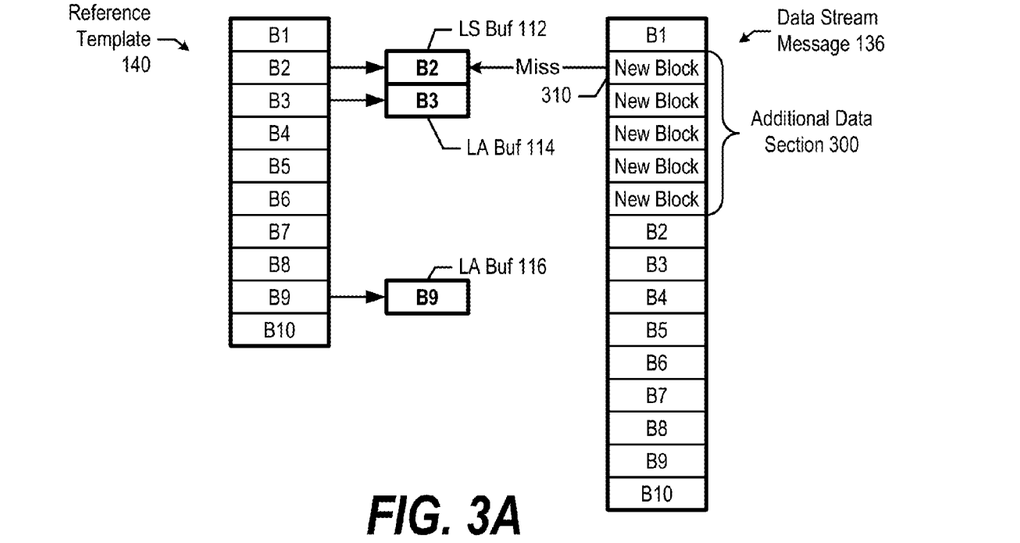
FIG. 3A is a diagram showing one example of a look-ahead comparator using buffers to compare template data blocks with data stream data blocks.

FIG. 3A is a diagram showing one example of look-ahead comparator 110s buffers used to compare template data blocks with data stream data blocks. The example shown in FIG. 3A shows that reference template 140 includes ten data blocks 131-B10 (each block may contain more than one byte), and data stream message 136 includes the same ten data blocks plus an additional data section 300 that includes five additional data blocks.

Figure 4A:
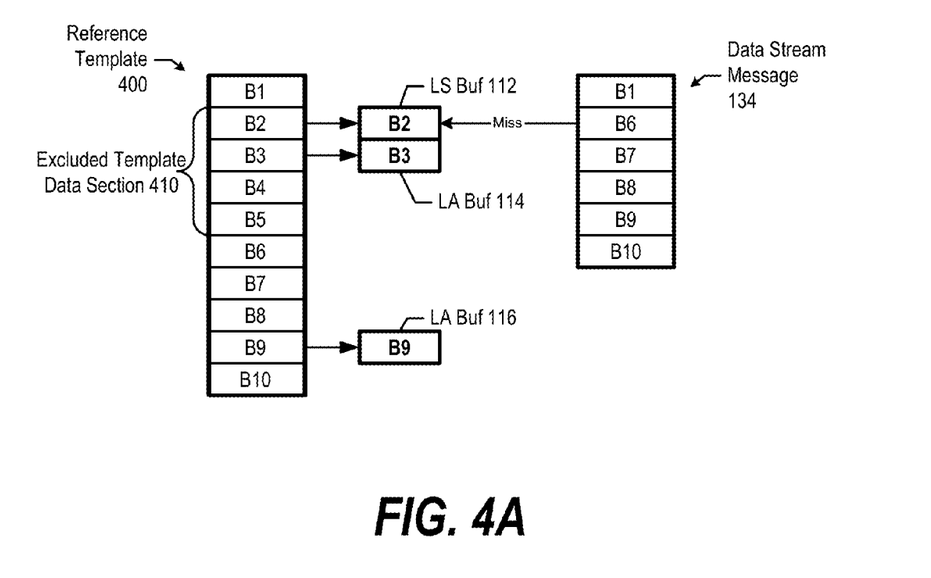
FIG. 4A is a diagram showing one example of a reference template synchronizing to a data stream message that excludes template data blocks.
Figure 4B:
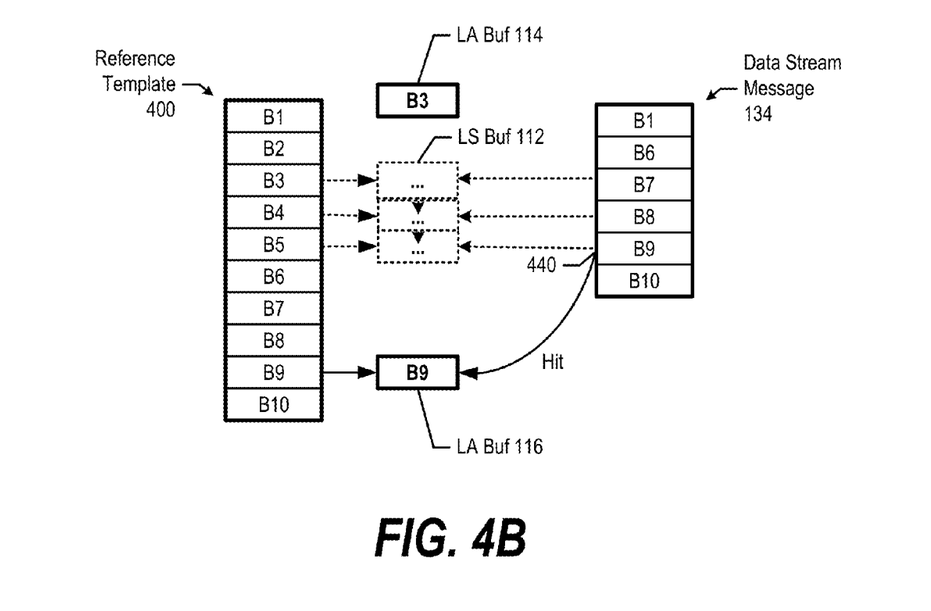
FIG. 4B is a diagram showing one example of a reference template re-synchronizing to a data stream message after falling out of synchronization.
Figure 5:
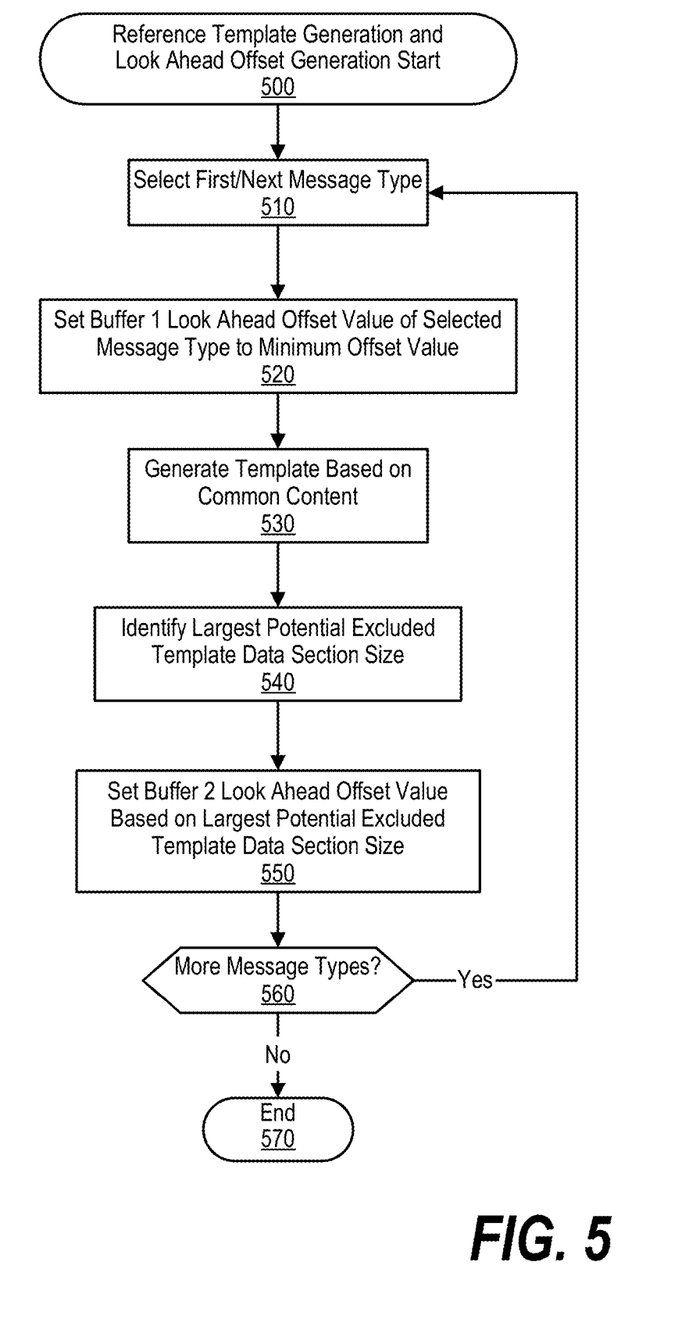
FIG. 5 is a flowchart showing steps taken in generating reference templates for message types as well as storing look-ahead offset values to correspond with the reference templates.

Look-ahead buffers 114 and 116 are offset a predefined amount from lock step buffer 112 (see FIG. 5 and corresponding text for further details). FIG. 3A shows that look-ahead buffer 114 is offset one data block, and look-ahead buffer 116 is offset seven data blocks. In one embodiment, look-ahead buffer 114 is offset one data block to enable fast resynchronization of data stream messages having additional data sections (shown in FIG. 3A), and, in this embodiment, look-ahead buffer 116 is offset an amount of data blocks corresponding to a largest potential template data section size excluded from a data stream message (see FIGS. 4A, 4B, and corresponding text for further details). In another embodiment, look-ahead comparator 110 may use more or less look-ahead buffers than the number disclosed herein.

When lock step buffer 112's pointer 122 advances to point to "block 2," lock step buffer 112 loads the block 2 data block from the template. Likewise, pointers 124 and 126 advance and look-ahead buffer 114 loads the block 3 data bock and look-ahead buffer 116 stores the block 9 data block. However, when look-ahead comparator 110 compares lock step buffer 112's contents with new block 310, look-ahead comparator 110 determines a miss and, in turn, look-ahead buffer 114's pointer freezes and block 3 stays stored in look-ahead buffer 114. Likewise, look-ahead buffer 116's pointer freezes and block 9 stays stored in look-ahead buffer 116. Lock step buffer 112's pointer, however, continues to advance as look-ahead comparator 110 continues to receive new data blocks from data stream message 136 and attempts to synchronize data stream message 136 with reference template 140 (see FIG. 3B and corresponding text for further details).

Figure 3B:
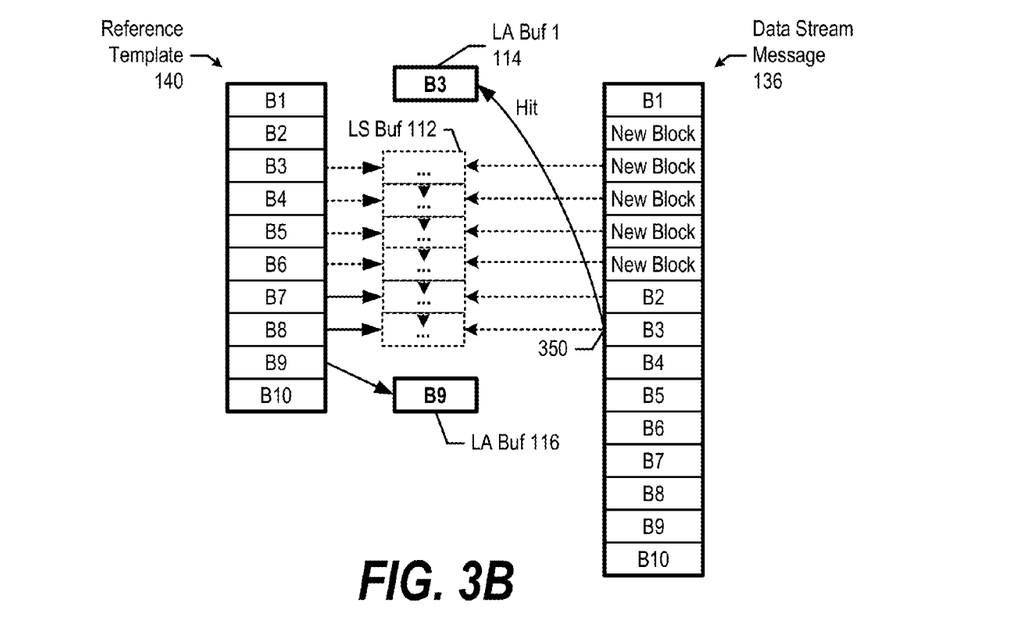
FIG. 3B is a diagram showing one example of a reference template re-synchronizing to a data stream message after falling out of synchronization.

FIG. 3B is a diagram showing one example of a reference template re-synchronizing to a data stream message after falling out of synchronization. FIG. 3B shows lock step buffer 112 advancing through blocks 3, 4, 5, 6, 7, and 8 of reference template 140, whose data is compared against subsequent data blocks in data stream message 136. Since data stream message 136 includes additional data section 300, data stream message 136 is out of sync with reference template 140, thus generating misses by look-ahead comparator 110. However, when look-ahead comparator 110 receives block 3 (350) of data stream message 136, look-ahead comparator 110 matches the data stream data block with look-ahead buffer 114's data (which was frozen as discussed above). As a result, look-ahead comparator 110 updates lock step buffer 112's pointer information to look-ahead buffer 114's pointer's information and, in turn, resynchronizes data stream message 136 with reference template 140. For example, assuming look-ahead buffer 114 points to location "632" in the reference template, look-ahead comparator 110 updates lock step buffer to point to location "632." In addition, look-ahead comparator 110 unfreezes look-ahead buffers and sets their pointers to the pre-defined look-ahead offset values with respect to the new location of lock step buffer.

FIG. 4A is a diagram showing one example of a reference template synchronizing to a data stream message that excludes template data blocks. The example shown in FIG. 4A shows that reference template 400 includes ten data blocks (B1-B10), and data stream message 134 includes six of the ten data blocks (excluded template data section 410 is excluded from data stream message 134).

When lock step buffer 112 stores block 2 and look-ahead comparator 110 compares lock step buffer 112's contents with block 6 of data stream message 134, look-ahead comparator 110 determines a miss and, in turn, buffer 114's pointer freezes and data block 3 stays in look-ahead buffer 114. Likewise, look-ahead buffer 116's pointer freezes and data block 9 stays in look-ahead buffer 116. Lock step buffer 112's pointer continues to advance as look-ahead comparator 110 receives subsequent data blocks from data stream message 134 and attempts to synchronize data stream message 136 with reference template 140 (see FIG. 4B and corresponding text for further details).

FIG. 4B is a diagram showing one example of a reference template re-synchronizing to a data stream message after falling out of synchronization. FIG. 4B shows lock step buffer 112 advancing through data blocks 3, 4, and 5 of reference template 400, which look-ahead comparator 110 compares against data blocks 7, 8, and 9 of data stream message 134. Since data stream message 134 excludes data blocks 2 through 5, look-ahead comparator 110 determines misses relative to lock step buffer 112's contents. However, look-ahead comparator 110 determines a hit (match) when look-ahead comparator 110 compares data block 9 (440) with look-ahead buffer 116's data (which was frozen as discussed above). As a result, look-ahead comparator 110 updates lock step buffer 112's pointer information to look-ahead buffer 116's pointer's information and, in turn, resynchronizes data stream message 134 with reference template 400. In addition, look-ahead comparator 110 unfreezes look-ahead buffers and sets their pointers to the pre-defined look-ahead offset values with respect to the new location of lock step buffer.

FIG. 5 is a flowchart showing steps taken in generating reference templates for message types as well as storing look-ahead offset values to correspond with the reference templates. Processing commences at 500, whereupon processing selects a first message type at 510. For example, processing may select "message type A" in FIG. 2 as the first message type. At 520, processing sets look-ahead buffer 1's (114) offset value to a minimum offset value, such as one data block. As discussed herein, look-ahead buffer 1 114 may be used to resynchronize the reference template with the data stream when the data stream includes an additional data section. By configuring look-ahead buffer 1's offset value at a minimum value, resynchronization occurs shortly after the additional data section ends (see FIGS. 3A, 3B, and corresponding text for further details).

At 530, processing generates a template for the selected message type based upon, for example, common content found during message type evaluations. For example, FIG. 2 shows the amount of common content for each message type (column 240) and processing generates the message type template based upon the common content identified during the analysis. As one skilled in the art can appreciate, the reference template may be generated using a longest common subsequence extraction technique. In one embodiment, one of the sample messages may be chosen as the template.

At 540, processing identifies, from different messages of the same message type, the largest potential excluded template data section size that is excluded from the different messages relative to the generated reference template. For example, message type A's template may include 22,670 bytes and one of the messages during the evaluation was 22,000 bytes because 670 consecutive bytes are not included in the message that are included in the template. In this example, the largest potential excluded template data section size is 670 bytes.

At 550, processing sets buffer 2's (116) look-ahead offset value larger (e.g., one block larger) than the largest potential excluded template data section size. As discussed herein, look-ahead buffer 2 is used to resynchronize the data stream with the reference template in situations where the reference template includes a template data section that is not included in a data stream message (see FIGS. 4A, 4B, and corresponding text for further details). In one embodiment, processing may set buffer 2's look-ahead offset value to a value less than the largest potential excluded template data section size, which may reduce synchronization capability for messages with large excluded template data sections, but decreases the time to synchronize messages with smaller excluded template data sections. In another embodiment, processing may use more than two look-ahead buffers with different look-ahead offset values.

A determination is made as to whether there are more message types for which to generate a template and configure look-ahead offset values for the message types (decision 560). If there are more message types, decision 560 branches to the "Yes" branch, which loops back to select and analyze the next message type. This looping continues until processing has generated a template and configured corresponding look-ahead offset values for each message type, at which point decision 560 branches to the "No" branch, whereupon processing ends at 570.

Figure 6:
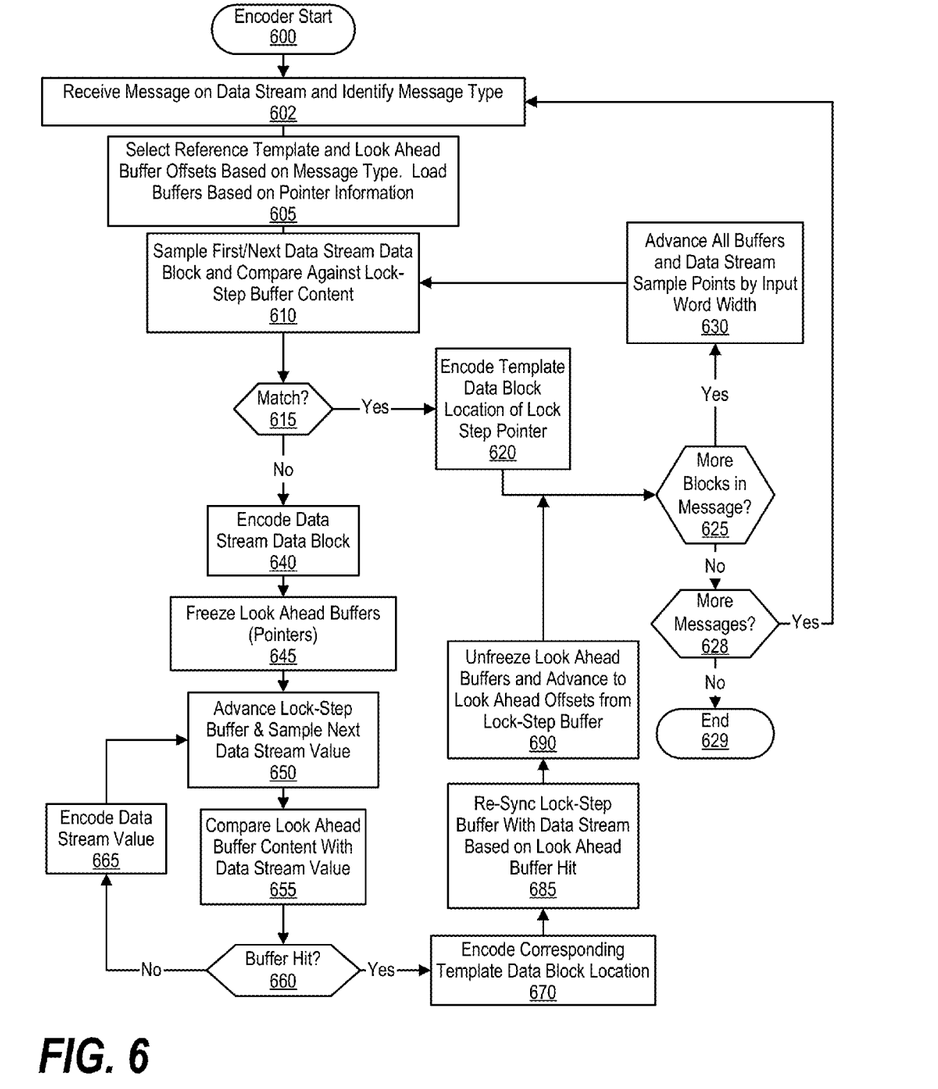
FIG. 6 is a flowchart showing one example of steps taken to encode a data stream based upon reference templates.

FIG. 6 is a flowchart showing one example of steps taken to encode a data stream based upon reference templates. Processing commences at 600, whereupon processing receives a message on the data stream and identifies the message's message type at 602 (e.g., message type A, message type B, etc.). At 605, processing selects a reference template corresponding to the identified message type and sets look-ahead buffer offsets corresponding to the message types. Processing also loads template data blocks into the lock step buffers and look-ahead buffers based upon the pointers' corresponding pointer information. In one embodiment, processing sends a message type identifier over the computer network so a receiving decoder may load a reference template corresponding to the message type in preparation for decode (see FIG. 7 and corresponding text for further details).

At step 610, processing receives the first data block in the data stream message and compares the data stream data block against the template value loaded in the lock step buffer (lock step buffer 112). A determination is made as to whether the data stream data matches the lock step buffer value (decision 615). If a match exists, decision 615 branches to the "Yes" branch, whereupon processing encodes the template data block location pointed to by the lock step buffer's pointer 620. As such, when the receiving system's decoder decodes the encoded template data block location, the decoder retrieves the corresponding data block from the template data block location (see FIG. 7 and corresponding text for further details).

A determination is made as to whether there are more data blocks in the data stream message (decision 625). If there are more data blocks in the data stream message, decision 625 branches to "Yes" branch, whereupon processing advances all buffer pointers (lock step pointer 122 and look-ahead pointers 124 and 126), and samples the next data stream data block in the data stream (630). On the other hand, if there are no more data blocks in the data stream message, decision 625 branches to the "No" branch, whereupon a determination is made as to whether there are more data stream messages on the data stream (decision 628). If there are more data stream messages, decision 628 branches to the "Yes" branch, which loops back to receive the next data stream message, load a corresponding reference template, and load corresponding look-ahead buffer offset values. On the other hand, if the data stream has ended, decision 628 branches to the "No" branch, whereupon processing ends at 629.

Referring back to decision 615, when a match does not occur between the data stream data and the lock step buffer value, decision 615 branches to the "No" branch, whereupon processing encodes the data stream data block at 640. At 645, processing freezes the look-ahead buffers (pointers), thus maintaining the currently loaded template data block values.

At 650, processing advances the lock step buffer (buffer 112) and samples the next data stream data block. Processing compares the look-ahead buffer values with the sampled data stream data block at 655. In one embodiment, processing receives n bytes of data from the input stream, and each buffer includes 2n bytes of template data. In this embodiment, a comparison in a buffer entails "n+1" comparisons such that each comparison compares the template data with different successive n bytes in the buffers. For example, if n=8, processing compares bytes 0-7 of the input data with bytes 0-7 of the buffer, then bytes 1-8 of the buffer, then bytes 2-9, and etc.

A determination is made as to whether one of data blocks included in one of the buffers (lock step or look-ahead) matches the sampled data stream data block (buffer hit, decision 660). If there is not a buffer hit, decision 660 branches to the "No" branch, whereupon processing encodes the input stream value at 665. At step 650, processing samples the next data stream data block and advances the lock step buffer pointer (while continuing to freeze the look-ahead buffer pointers).

Referring back to decision 660, when the sampled input stream value matches one of the look-ahead buffer values, decision 660 branches to the "Yes" branch, whereupon processing encodes the matching look-ahead buffer pointer's information (location and number of matching bytes) at 470. In one embodiment, the buffers may be "2n" bytes where "n" is the number of bytes sampled in the input stream. In this embodiment, processing incrementally checks the n bits of input bytes against the 2n bytes in the buffer. For example, a template buffer may contain bytes 48 to 63 (16 bytes) of template and the input width is 8 bytes. In this example, processing compares bytes 48-55 to the input sample, then bytes 49-56, then bytes 50-57, etc. In this example, if a match occurs at bytes 50-57, the processing encodes pointer location "50" (as well as other pertinent pointer information such as a number of matching bytes).

At 685, processing re-synchronizes the lock step buffer with the data stream by updating the lock step buffer's pointer information to the pointer information corresponding to the matching look-ahead buffer's pointer. At 490, processing unfreezes the look-ahead buffers and advances the look-ahead buffers to the pre-defined look-ahead offset values from the lock step buffer to begin sampling the data stream. In one embodiment, processing may wait to resynchronize the lock step buffer until multiple consecutive matches between the look-ahead buffer and the data stream are detected in order to avoid premature synchronization. Processing then proceeds to determine if more data blocks and/or messages are included in the data stream (decisions 625 and 628) and process the data blocks and/or more messages as discussed above.

Figure 7:
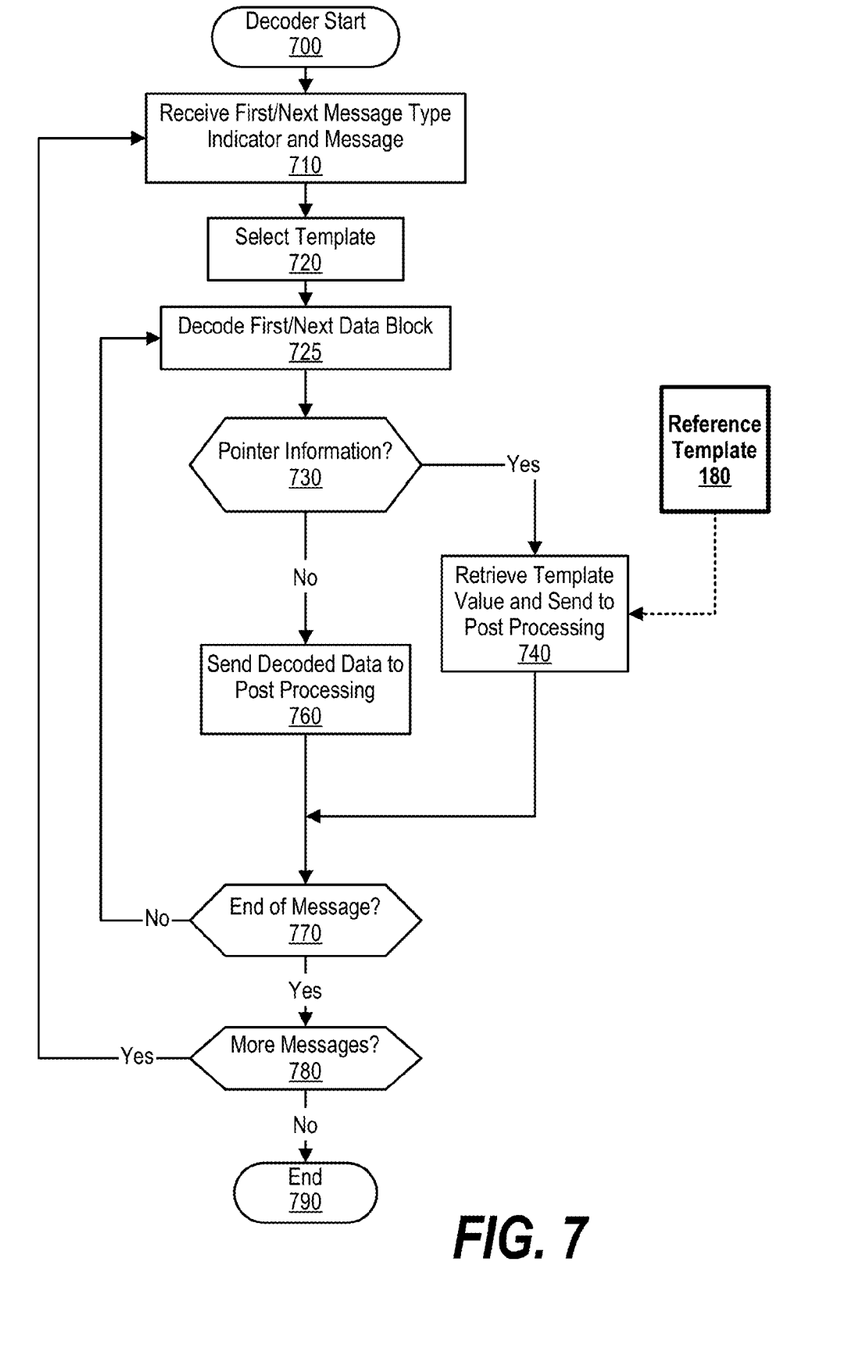
FIG. 7 is a flowchart showing an example of steps taken by a data stream decoder to decode an encoded differential data stream.

FIG. 7 is a flowchart showing an example of steps taken by a data stream decoder to decode an encoded differential data stream. Processing commences at 700, whereupon processing receives a first message type identifier and encoded message at 710. In one embodiment, the data stream includes the message type identifier in a header that indicates the type of encoded message being received. At 720, processing selects a reference template corresponding to the received message type identifier (e.g., message type A).

At 725, processing decodes the first data block and a determination is made as to whether the decoded data block includes pointer information corresponding to a template data block location (decision 730). If the decoded data block includes pointer information, decision 730 branches to the "Yes" branch, whereupon processing retrieves a data block from template 180 at the corresponding template data block location and sends the retrieved data block to post processing (740).

On the other hand, if the decoded data block is not pointer information corresponding to a template data block location, but rather actual data stream data, decision 730 branches to the "No" branch, whereupon processing sends the decoded data stream data to post processing (760). A determination is made as to whether processing has reached the end of the received message (decision 770). If the end of the message has not been reached, decision 770 branches to the "No" branch, whereupon processing loops back to decode the next data block in the message. This looping continues until the message has been processed, at which point decision 770 branches to the "Yes" branch, whereupon a determination is made as to whether there are more messages to process in the encoded data stream (decision 780). If there are more messages to process, decision 780 branches to the "Yes" branch, which loops back to receive the next message and retrieve a reference template based upon the next message type. This looping continues until the data stream ends, at which point decision 780 branches to the "No" branch, whereupon processing ends at 790.

Figure 8:
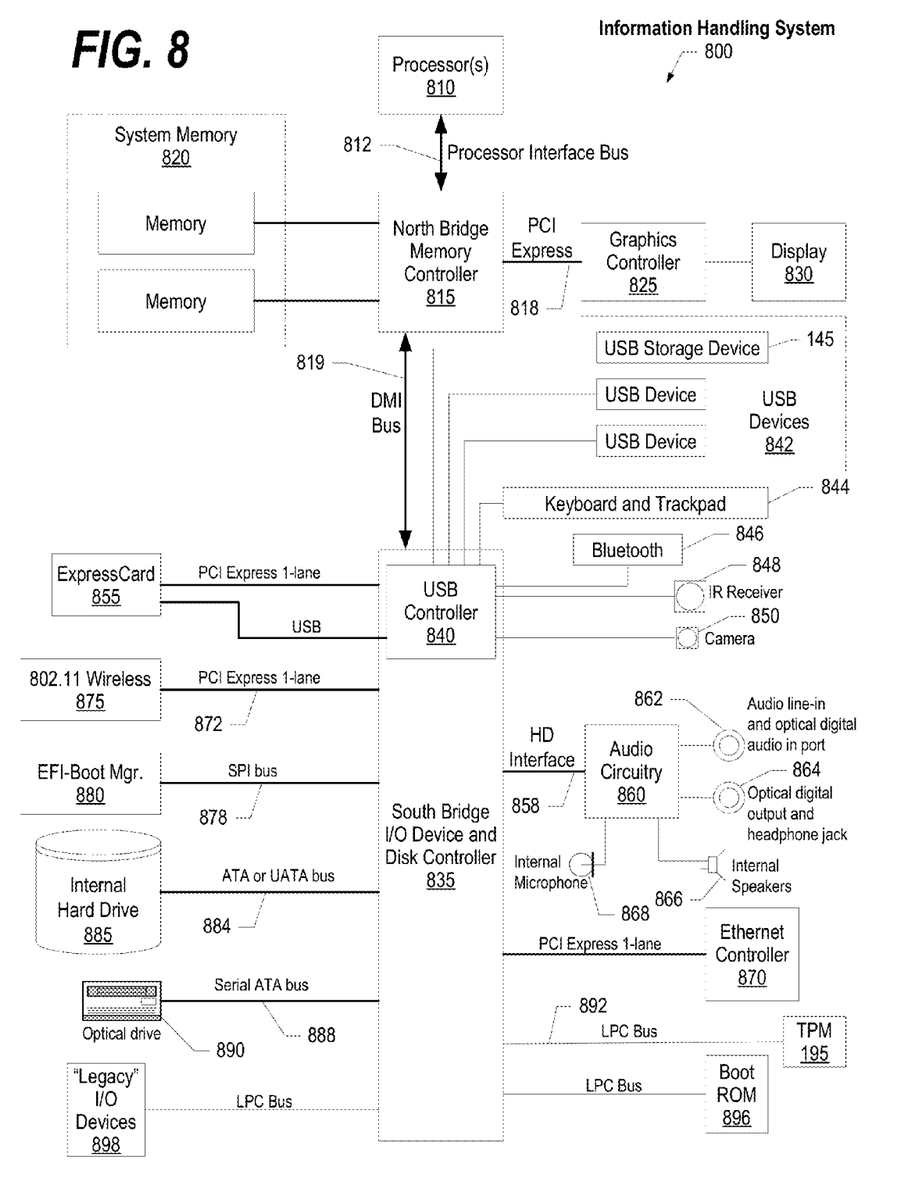
FIG. 8 is a block diagram of a data processing system in which the methods described herein can be implemented.

FIG. 8 illustrates information handling system 800, which is a simplified example of a computer system capable of performing the computing operations described herein. Information handling system 800 includes one or more processors 810 coupled to processor interface bus 812.

Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 895) shown in FIG. 8 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 9.

Figure 9:
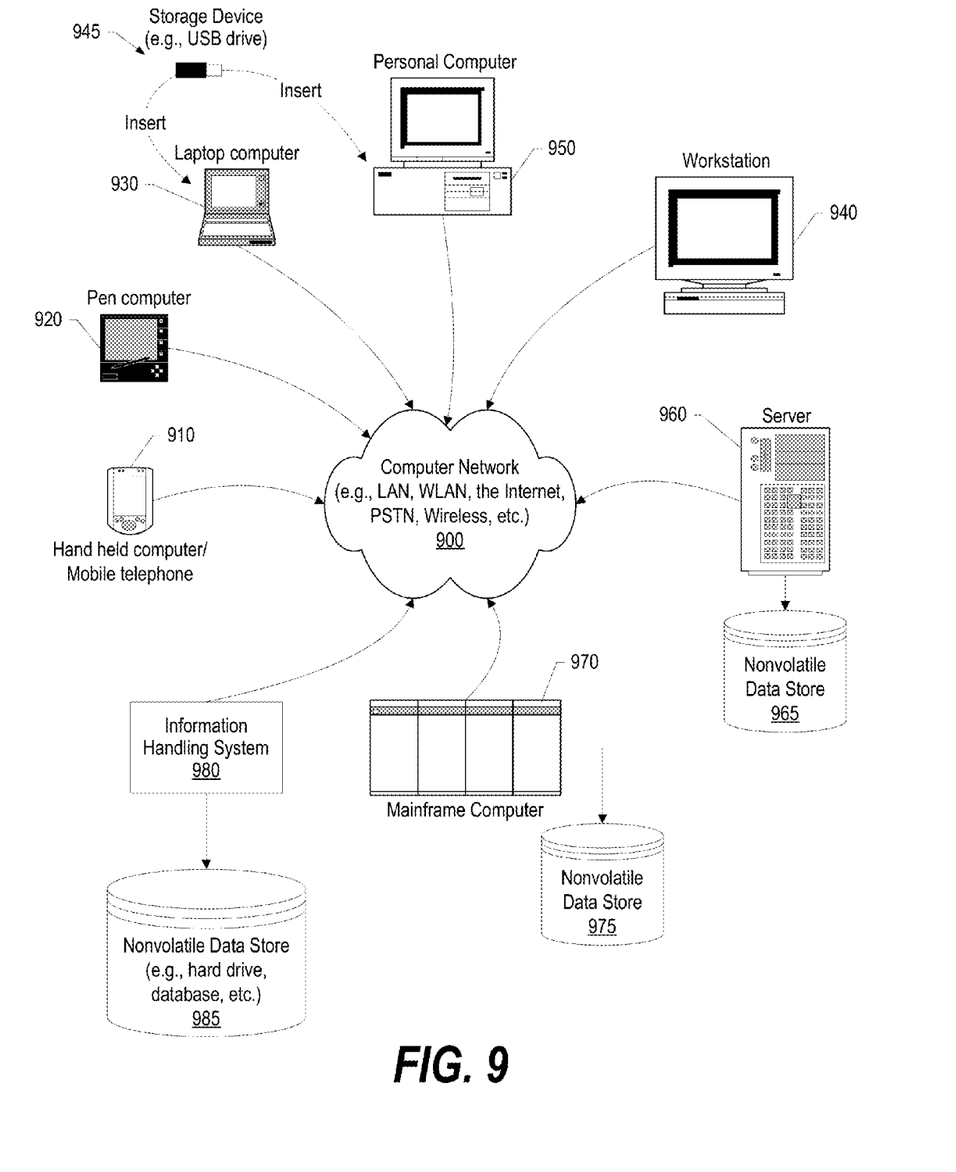
FIG. 9 provides an extension of the information handling system environment shown in FIG. 8 to illustrate that the methods described herein can be performed on a wide variety of information handling systems which operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method of synchronizing a reference template to a data stream, the method comprising:
   determining a look-ahead offset value based upon a largest potential template data section size in a reference template that is excludable from a data stream;
   loading, by one or more processors, a first buffer with a first data block and loading a second buffer with a second data block, wherein the first data block corresponds to a location in the reference template corresponding to a lock step pointer and the second data block corresponds to a location in the reference template corresponding to a look ahead pointer location that is based on the lock step pointer location and the look-ahead offset value;
   preserving, by at least one of the one or more processors, the second data block in the second buffer in response to determining that the first data block is different than a data stream data block included in the data stream; and
   synchronizing, by at least one of the one or more processors, the reference template to the data stream in response to determining that the preserved second data block matches a subsequent data stream data block included in the data stream, wherein the synchronizing includes updating the lock step pointer location based upon the look-ahead pointer location.

2. The method of claim 1 further comprising:
   in response to the determination that the first data block is different than the data stream data block:
   advancing the lock step pointer location; and
   inhibiting advancement of the look-ahead pointer location.

3. The method of claim 1 wherein, in response to the updating of the lock step pointer location, updating the look-ahead pointer location based upon the updated lock step pointer location and the look-ahead offset value.

4. The method of claim 1 further comprising:
   in response to matching the preserved second data block to the subsequent data stream data block:
   encoding pointer information that includes the look-ahead pointer location; and
   sending the encoded pointer information to a recipient computer system.

5. The method of claim 4 further comprising:
   decoding, by the recipient computer system, the encoded pointer information; and
   retrieving, by the recipient computer system, recipient template data from a recipient reference template according to the decoded pointer information.

6. The method of claim 1 wherein the data stream data block is included in a data stream message, the method further comprises:
   identifying a message type corresponding to the data stream message; and
   selecting the reference template, from a plurality of reference templates, based upon the identified message type.

7. The method of claim 6 wherein the subsequent data stream data block is subsequent to an additional data section that is included in the data stream message and excluded from the reference template.

8. The method of claim 6 wherein the second data block is subsequent to a template data section that is included in the reference template and excluded from the data stream message.

9. The method of claim 1 wherein the second data block is twice as wide as the data stream data block, the method further comprising:
   performing the synchronization in response to matching a plurality of second data blocks retrieved from the reference template to a plurality of subsequent data stream data blocks included in the data stream.

10. An information handling system comprising:
    one or more processors;
    a plurality of buffers accessible to at least one of the one or more processors;
    a memory coupled to at least one of the one or more processors;
    a set of instructions stored in the memory and executed by at least one of the one or more processors in order to perform actions comprising:
    determining a look-ahead offset value based upon a largest potential template data section size in a reference template that is excludable from a data stream;
    loading a first buffer with a first data block and loading a second buffer with a second data block, wherein the first data block corresponds to a location in the reference template corresponding to a lock step pointer and the second data block corresponds to a location in the reference template corresponding to a look ahead pointer location that is based on the lock step pointer location and the look-ahead offset value, the first buffer and the second buffer included in the plurality of buffers;
    preserving the second data block in the second buffer in response to determining that the first data block is different than a data stream data block included in the data stream; and
    synchronizing the reference template to the data stream in response to determining that the preserved second data block matches a subsequent data stream data block included in the data stream, wherein the synchronizing includes updating the lock step pointer location based upon the look-ahead pointer location.

11. The information handling system of claim 10 wherein, in response to the determination that the first data block is different than the data stream data block, the set of instructions, when executed by at least one of the one or more processors, performs further actions comprising:
advancing the lock step pointer location; and
inhibiting advancement of the look-ahead pointer location.

12. The information handling system of claim 10 wherein, in response to matching the preserved second data block to the subsequent data stream data block, the set of instructions, when executed by at least one of the one or more processors, performs further actions comprising:
encoding pointer information that includes the look-ahead pointer location; and
sending the encoded pointer information to a recipient computer system.

13. A computer program product stored in a non-transitory computer readable storage medium, comprising computer program code that, when executed by an information handling system, causes the information handling system to perform actions comprising:
determining a look-ahead offset value based upon a largest potential template data section size in a reference template that is excludable from a data stream;
loading, by one or more processors, a first buffer with a first data block and loading a second buffer with a second data block, wherein the first data block corresponds to a location in the reference template corresponding to a lock step pointer and the second data block corresponds to a location in the reference template corresponding to a look ahead pointer location that is based on the lock step pointer location and the look-ahead offset value;
preserving the second data block in the second buffer in response to determining that the first data block is different than a data stream data block included in the data stream; and
synchronizing the reference template to the data stream in response to determining that the preserved second data block matches a subsequent data stream data block included in the data stream, wherein the synchronizing includes updating the lock step pointer location based upon the look-ahead pointer location.

14. The computer program product of claim 13 wherein, in response to the determination that the first data block is different than the data stream data block, the information handling system performs further actions comprising:
advancing the lock step pointer location; and
inhibiting advancement of the look-ahead pointer location.

* * * * *